March 31, 1953  Y. A. ROCARD  2,633,562
VOLTAGE REGULATING DEVICE
Filed Oct. 29, 1949  2 SHEETS—SHEET 1

INVENTOR.
Yves André Rocard
BY
HIS AGENT

March 31, 1953    Y. A. ROCARD    2,633,562
VOLTAGE REGULATING DEVICE
Filed Oct. 29, 1949    2 SHEETS—SHEET 2

INVENTOR.
Yves André Rocard
BY
HIS AGENT

Patented Mar. 31, 1953

2,633,562

UNITED STATES PATENT OFFICE 2,633,562

VOLTAGE REGULATING DEVICE

Yves André Rocard, Paris, France

Application October 29, 1949, Serial No. 124,315

8 Claims. (Cl. 323—66)

The present invention relates to voltage regulation devices and more particularly to devices for supplying a load with a constant voltage from sources of alternating current subject to voltage fluctuations.

It has been proposed heretofore to employ so-called saturable reactors in voltage regulating circuits. Such circuits have the advantage of being more sturdy and of longer life than corresponding electronic circuits, since saturable reactors are very rugged and have no moving parts. However, these voltage regulating circuits employing reactors generally require some type of an electronic device to supply the reference voltage for controlling the reactor, and to that extent are subject to occasional failure. Further, such regulating circuits are not adapted to give good regulation for relatively large fluctuations in supply voltage, nor for loads requiring relatively large, variable amounts of power, and are sensitive to frequency variations.

It is an object of the invention, accordingly, to provide new and improved voltage regulating devices employing saturable reactors.

Another object of the invention is to provide apparatus for supplying a load with substantially constant voltage from sources of alternating current voltage which may fluctuate over a relatively wide range.

Yet another object of the invention is to provide apparatus of the above character which is relatively insensitive to variations in supply frequency.

Still another object of the invention is to provide apparatus which will regulate the voltage input to loads requiring large and varying amounts of power.

A further object is to provide a novel and highly useful circuit arrangement employing a saturable reactor.

These and other objects of the invention are attained by inserting one or more saturable reactors in series across a source of alternating current, and controlling the magnetic saturation of said reactor or reactors in accordance with the alternating current passing through the main windings thereof in such a manner that the voltage thereacross remains substantially constant.

In a first exemplary embodiment of the invention, a saturable reactor is inserted across a source of alternating current, and the magnetic saturation of this reactor controlled in such a manner that the impedance of its main winding varies linearly and inversely with the magnitude of the alternating current passing therethrough. Since the voltage across the main winding is proportional to the product of the current and the impedance, this voltage will be constant for wide variations in the alternating current. By utilizing this principle, highly effective voltage regulating devices may be constructed in accordance with the invention, and by supplementary circuit arrangements, these regulating devices may be made relatively insensitive to frequency variations.

In a second exemplary embodiment of the invention, two saturable reactors are placed in series across a source of alternating current, and the magnetic saturation of one of said reactors controlled in accordance with the voltage across the other of said reactors in such a manner that the voltage across the series arrangement of both reactors remains substantially constant.

Additional objects and advantages of the invention will become apparent from the following detailed description of several representative embodiments thereof, taken in conjunction with the accompanying drawings, in which.

Figure 1:
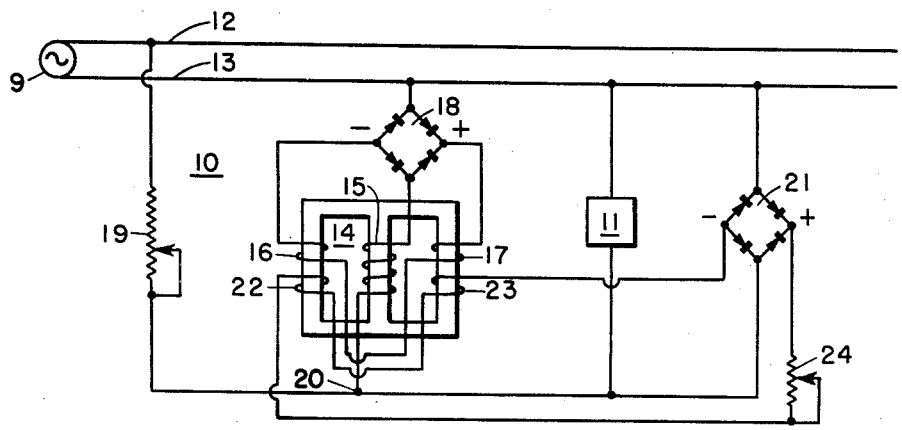
Fig. 1 is a circuit diagram of a first exemplary embodiment of the invention wherein the load is placed directly across the voltage regulating apparatus.

In the exemplary embodiment shown in Fig. 1, alternating current from source 9 is supplied to the regulating apparatus 10 and load 11 by means of conductors or bus bars 12 and 13. The load 11 may be resistive, inductive or capacitative, and is assumed to be of the type requiring a highly regulated source of voltage for proper operation, as, for example, a battery charger, in which case, of course, the alternating current applied to load 11 must be rectified.

A saturable reactor 14, which may be of any known type, but is preferably a solid iron core with three legs, is included in regulating device 10. Of course, reactor 14 could comprise two separate cores, as will be readily understood. On the central leg is wound the main or alternating current winding 15, while on the two outer legs are wound direct current windings 16 and 17 respectively, which are connected in series in such a manner that no alternating current will be induced therein, as is well known in the art. As is also well known, the impedance of winding 15 will vary in accordance with magnetic saturation of the iron core. The alternating current winding 15 is connected to conductor 13 through a full wave rectifier 18 and to conductor 12 by means of variable resistor 19. Rectifier 18, which may be of any suitable type, supplies pulsating direct current through windings 16 and 17 in series. The resistance of resistor 19 is preferably of the same order of magnitude as the impedance of reactor 14, but is adjustable to give maximum power transfer.

As will be explained hereinafter, the voltage between conductor 13 and junction 20 of resistor 19 and winding 15 will remain constant for wide variations in the amplitude of the current passing through said winding. In order that reactor 14 will operate in a region of maximum efficiency, it is preferable that said reactor be magnetically biased, and the constant potential between conductor 13 and junction 20 offers an excellent source of constant current for biasing. Accordingly, a full wave rectifier 21 is connected between junction 20 and conductor 13. The rectified current is sent through balanced biasing windings 22 and 23, and may be controlled by variable resistor 24 to place the reactor 14 in the region of maximum efficiency. It is, of course, understood that any source of direct current may be employed if desired, or even no bias at all used in certain instances.

As is well known, the inductance of a winding on an iron core reactor will vary, over a certain range, in inverse proportion to the alternating current passing therethrough and linearly with the controlling action of the control windings. In accordance with the invention, the controlling action of windings 16 and 17 is made proportional to the current in winding 15, and thereby the voltage across winding 15 remains constant for wide variations in the alternating current therethrough. It has been found that the controlling action will be proportional to the alternating current, if the control windings and the main winding have substantially equal ampere-turns. In the embodiment shown in Fig. 1, this is accomplished by passing substantially all the alternating current in winding 15 through windings 16 and 17 as direct current, and by placing substantially the same number of turns on winding 15 as are on windings 16 and 17 combined. In practice, the number of turns on windings 16 and 17 must be adjusted to compensate for the resistance thereof. The voltage across the reactor will then be substantially constant within the given range of current variations.

Thus, in operation, load device 11, which is across rectifier 18 and reactor 14, is supplied with a constant voltage that is slightly lower than the voltage across line 12 and 13, since across resistor 19 is a substantial voltage drop. If, for example, the voltage across the line increases slightly, the current through winding 15 will be increased, which in turn decreases the inductance of said winding. Since, in accordance with the invention, the product of the current through winding 15 and the inductance thereof is substantially constant, the voltage applied to load 11 must also be constant. Thus, the voltage applied to the load is regulated in a highly effective manner, the increase in line voltage being absorbed by resistor 19.

It may be advantageous in many instances to employ other than a resistive impedance at 19 in order to adjust for a low power factor, possibly introduced by load 11. Further, since the impedance of winding 15 may vary with temperature, appropriate compensating circuits may be included in the regulating device 10.

Figure 3:
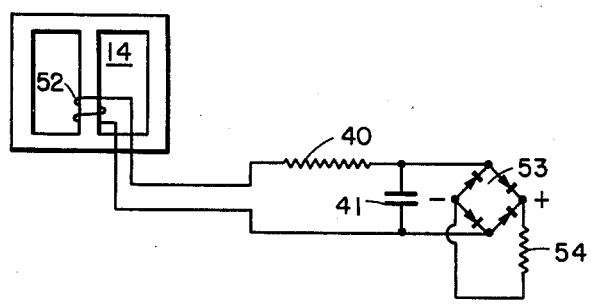
Fig. 3 is a modification of the arrangement shown in Fig. 2, wherein the voltage regulating device is made relatively insensitive to frequency changes in the supply voltage.

In order to compensate for the effect of variations in line frequency on the regulated voltage output, a discriminator circuit may be connected directly across conductors 12 and 13, and the output thereof passed through additional control windings on reactor 14. Preferably, however, circuits, such as shown in Fig. 3 hereinafter, are employed to compensate for frequency variations.

In designing the regulating circuit 10, account must also be taken of the expected variations in the current requirements of load 11, as well as in the variations in line voltage, since reactor 14 must maintain regulation for variations in its winding current equal and opposed to the load current variations. Thus, the amount of regulation that may be expected is a function of both the probable line voltage fluctuations and load current variations. Accordingly, if a regulating device is desired for a load which may have a wide range of current requirements, it is usually preferable to employ the modification exemplified in Fig. 2, wherein the output of the voltage control device is employed only as a standard in apparatus controlling the load voltage.

Figure 2:
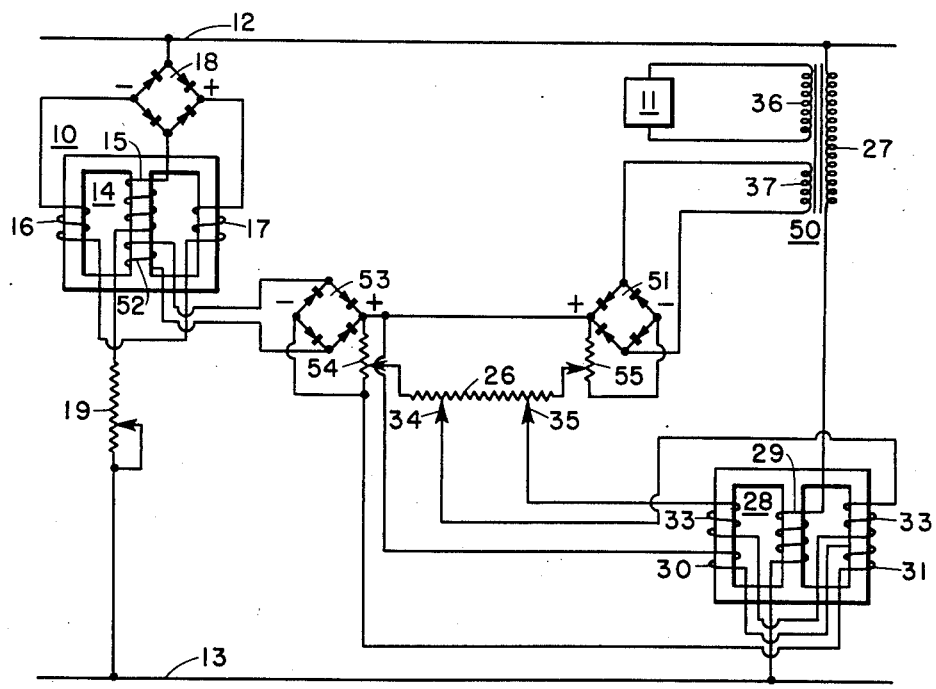
Fig. 2 is a circuit diagram of another arrangement of the first embodiment of the invention wherein the regulated voltage is employed as a voltage standard to control the power supplied to the load.

In Fig. 2, full wave rectifier 18, saturable reactor 14, with windings 15, 16 and 17, and an impedance 19 are employed as a constant potential device 10 across alternating current input conductors 12 and 13 in the same manner as in Fig. 1. Biasing windings, such as shown in Fig. 1, are also preferably employed. However, load 11 is not coupled directly to the control apparatus 10, but is connected independently to conductors 12 and 13, as, for example, by means of secondary 36 of transformer 50. In order that the voltage applied to load 11 will be sinusoidal as well as regulated, it may be desirable to include a filter in series with load 11, or in series with primary 27 of transformer 50. Also, secondary 37 of transformer 50 supplies a full wave rectifier 51 with an alternating current voltage proportional to the voltage supplied to load 11, which in turn applies a direct current voltage across a variable resistor 55.

An additional alternating current winding 52 on the center leg of reactor 14 supplies rectifier 53 with a constant potential. It is understood, of course, that this constant potential could be obtained from regulating circuit 10 in the manner described in connection with Fig. 1, if desired. Variable resistor 54, which is across rectifier 53, will have, therefore, a constant direct current voltage across its terminals, while variable resistor 55 will have a direct current voltage across its input terminals which is proportional to the voltage applied to load 11. By proper adjustment of the winding 52 on reactor 14 and the turns ratio of transformer 50, the potentials across resistors 54 and 55, respectively, may be made equal when load 11 has the proper supply voltage, and thus no current will flow in potentiometer 26 if the line voltage remains at its proper level. A more convenient adjustment, however, may be had by varying the output taps on resistors 54 and 55. Now, if the voltage applied to load 11 varies in magnitude, there will be a corresponding variation in current through potentiometer 26, the polarity and magnitude of this current indicating the direction and amount, respectively, of the load voltage variation. This variation in the current in potentiometer 26 may be employed to control any well known voltage regulating device in circuit with transformer 50. In Fig. 2, a saturable reactor 28 is shown, by way of example, as a means for controlling the voltage across the transformer 50.

In Fig. 2, therefore, primary winding 27 is connected in series with the main winding 29 of a second saturable reactor 28, which may be a type similar to reactor 14. By varying the inductance of winding 29, the potential across the primary 27 of transformer 50, and thus across load 11, may be varied. Reactor 28 is preferably biased by two direct current windings 30 and 31 in series, which bias may be conveniently taken from the constant potential across resistor 54. Another pair of direct current windings 32 and 33 are supplied with a potential from taps 34 and 35 on balancing potentiometer 26. The taps 34 and 35 are adjusted so that an increase in the potential across resistor 55 above that across resistor 54 will cause a current to flow in windings 32 and 33 in such a direction that the magnetic saturation of reactor 28 is decreased, and so that a decrease in potential across resistor 55 below that across resistor 54 will cause current to flow in windings 32 and 33 in the opposite direction.

In construction, transformer 27 and reactor 28 are selected in order that load 11 will have the proper voltage across its input terminals when the alternating current voltage between conductors 12 and 13 is normal. At that time, the potential across resistor 55 will be indicative of the proper potential being applied to load 11. Constant potential device 10 is then adjusted so that the voltage across resistor 54 is exactly equal to that across resistor 55 when the proper voltage is being applied to load 11. Taps 34 and 35 are then adjusted until reactor 28 gives proper regulation to the voltage applied to load 11.

In operation, therefore, if the voltage between the lines 12 and 13 increases slightly, for example, the potential across resistor 55 will become greater than the constant potential across resistor 54, and thus the current in windings 32 and 33 will cause the magnetic saturation of reactor 28 to decrease. This, in turn, increases the inductance of winding 29, thus creating a greater potential drop thereacross. Consequently, by proper adjustment, the potential across transformer 27 will decrease to the proper level whereby the voltage supplied to load 11 remains substantially constant.

It will, of course, be obvious to those skilled in the art that while the amplitude of the voltage across load 11 (Fig. 1) or resistor 54 (Fig. 2) is well regulated for a given frequency, if the frequency of the line voltage varies, the potential across these elements will vary also, since the potential across an inductance is proportional to frequency. In order to compensate for such variations, the modification of Fig. 2 shown in Fig. 3 may be employed.

In Fig. 3, the potential across resistor 54 will, of course, remain constant, as long as the frequency of the alternating current applied to winding 15 remains constant. However, in this circuit has been added a compensating voltage divider circuit comprising a resistor 40 in series with rectifier 53, and a capacitor 41 in parallel therewith. If the impedance of the capacitor in the given frequency range is negligible with respect to the impedance of resistor 40 or resistor 54, the potential applied across resistor 54 will remain constant even though the frequency of the line varies.

If it is desired to have saturable reactor 14 compensated directly for variations in input frequency, the voltage across resistor 40, which is a function of input frequency, may be rectified and applied to additional direct current windings (not shown) on reactor 14 in order to vary the inductance winding 15 with frequency shifts.

Figure 4:
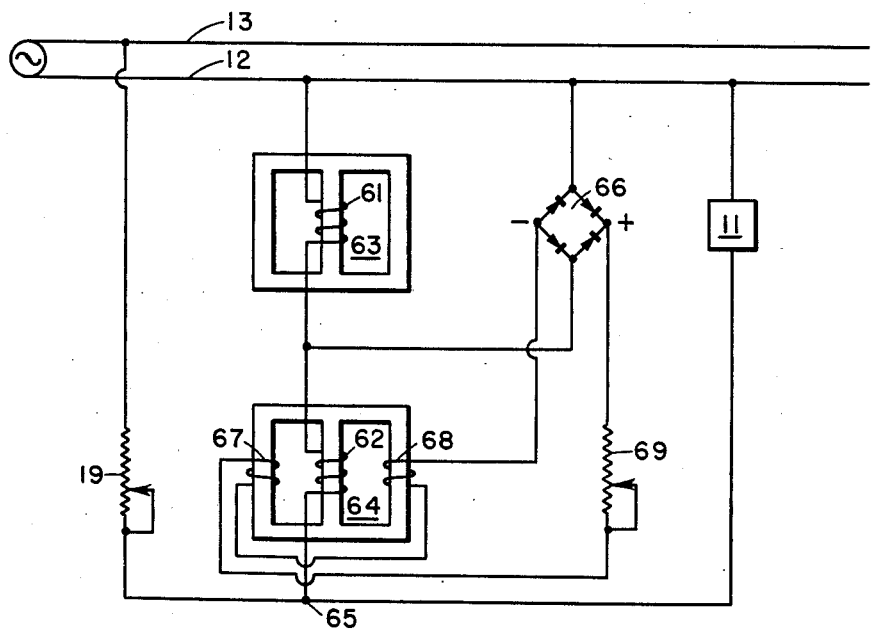
Fig. 4 is a circuit diagram of a second exemplary embodiment of the invention.

A second illustrative embodiment of the invention is shown in Fig. 4 wherein the alternating current voltage between conductors 12 and 13 is applied across a load 11 and a variable impedance 19, which may be similar to those shown in Figs. 1 or 2. In order to regulate the voltage input to load 11, a series circuit comprising the alternating current windings 61 and 62 of saturable reactors 63 and 64, respectively, is connected across load 11 between conductor 12 and the junction 65 of resistor 19 and winding 62. The necessary direct current biases are applied to reactors 63 and 64 respectively by means of direct current windings (not shown), which may be conveniently connected through rectifying means to the constant voltage between junction 65 and conductor 12, if desired.

In this second embodiment, the alternating current voltage across winding 61 is rectified by a full wave rectifier 66, and direct current proportional to this voltage is applied to balanced windings 67 and 68 on reactor 64. The magnitude of this direct current may be adjusted by means of a variable resistor 69 in circuit with rectifier 66, winding 67 and winding 68. In accordance with the invention, as the voltage across winding 61 increases, the direct current through windings 67 and 68 increases; accordingly, the magnetic saturation of reactor 64 increases and thus, the impedance of winding 62 decreases, decreasing the voltage thereacross. By proper adjustment of the windings, the voltage between junction 65 and line 12 (across reactors 63 and 64) will remain constant for variations in line voltage, the differential being taken up by resistor 19. Thus, of course, load 11 will have a constant voltage applied across its terminals.

In order to minimize the adjustments in the windings and resistors during construction of the embodiment shown in Fig. 4, the following steps are recommended. Separately, reactor 61 is tested to ascertain what change in voltage $\Delta E_1$ across winding 61 will occur for a change $\Delta i$ in the alternating current therethrough. Reactor 62 is separately tested to ascertain what change in voltage $\Delta E_2$ occurs for a change $\Delta i$ in the current therethrough. Then the following relations may be derived:

$$(1) \qquad a = \frac{\Delta E_1 + \Delta E_2}{\Delta E_1}$$

$$(2) \qquad b = \frac{\Delta E_2}{R_2 \Delta i}$$

where $R_2$ is the resistance of the direct current circuit, including rectifier 66, windings 67 and 68 and resistor 69. The voltage across the windings 61 and 62 in series will remain substantially constant if the ratio of the number of turns on windings 67 and 68 to the number of turns on winding 62 is substantially equal to $a/b$. The tests on reactors 61 and 62 are, of course, made with the proper direct current biases being applied thereto.

It will be understood that the several illustrative embodiments disclosed herein are susceptible of numerous modifications in form and detail within the scope of the invention. The embodiments described and shown in the drawings, therefore, are not to be regarded as limiting the scope of the following claims.

I claim:

1. A voltage regulating device comprising a saturable reactor, an alternating current winding wound on said saturable reactor, a rectifier connected on one terminal of said alternating current winding, an impedance of predetermined value connected in series with said winding and said rectifier, means for applying a source of alternating current across said series connection, means for applying a substantially constant bias to said saturable reactor, means connected to said rectifier for further biasing said reactor in proportion to the magnitude of alternating current passing through said winding, and output means connected in parallel with said winding and said rectifier.

2. A voltage regulating device comprising a saturable reactor, an alternating current winding wound on said saturable reactor, a rectifier connected to one terminal of said alternating current winding, an impedance of predetermined value connected in series with said winding and said rectifier, means for applying a source of alternating current across said series connection, means for applying a substantially constant bias to said saturable reactor, a second winding wound on said reactor and connected to said rectifier whereby alternating current passing through said alternating current winding is rectified and passed through said second winding, and output means connected in parallel with said alternating current winding and said rectifier.

3. The voltage regulating device of claim 2, wherein said alternating current winding and said second winding have substantially equal ampere-turns.

4. A voltage regulating device comprising a saturable reactor, an alternating current winding wound on said saturable reactor, a rectifier connected to one terminal of said alternating current winding, an impedance of predetermined value connected in series with said winding and said rectifier, means for applying a source of alternating current across said series connection, means connected to said rectifier for biasing said reactor in proportion to the magnitude of alternating current passing through said winding, output means connected in parallel with said winding and said rectifier, and means for further biasing said reactor in proportion to the magnitude of the alternating current voltage across said output means.

5. A voltage regulating device comprising a saturable reactor, an alternating current winding wound on said saturable reactor, a rectifier connected to one terminal of said alternating current winding, an impedance of predetermined value connected in series with said winding and said rectifier, means for applying a source of alternating current across said series connection, means connected to said rectifier for biasing said reactor in proportion to the magnitude of alternating current passing through said winding, output means connected in parallel with said winding and said rectifier, a second rectifier connected in parallel with said output means, and a second winding wound on said reactor connected to said second rectifier, whereby said reactor is further biased in proportion to the alternating current voltage across said output means.

6. A voltage regulating device comprising a saturable reactor, an alternating current winding wound on said saturable reactor, a rectifier connected to one terminal of said alternating current winding, an impedance of predetermined value connected in series with said winding and said rectifier, means for applying a source of alternating current across said series connection, a second winding wound on said reactor and having substantially the same number of turns as said alternating current winding, means connecting said second winding to said rectifier whereby alternating current in said alternating current winding is rectified and passed through said second winding, output means connected in parallel with said rectifier and said alternating current winding, a second rectifier connected in parallel with said output means, and a third winding wound on said reactor connected to said second rectifier, whereby said reactor is biased in proportion to the alternating current voltage across said output means.

7. In an electrical control system; a voltage regulating circuit which comprises a first saturable reactor, a first alternating current winding wound on said first reactor, a rectifier connected to one terminal of said alternating current winding, an impedance of predetermined value connected in series with said winding and said rectifier, means for applying a source of alternating current across said series connection, means for applying a substantially constant bias to said first reactor, means connected to said rectifier for further biasing said first reactor in proportion to the magnitude of alternating current passing through said winding; a second saturable reactor including a second alternating winding, a load circuit, means connecting said second winding and said load circuit in parallel with a source of alternating current, and means for biasing said second saturable reactor in accordance with the magnitude of the difference between the alternating current voltages across said load circuit and the alternating current voltage across said first winding.

8. The electrical control system of claim 7, wherein said means for biasing said second saturable reactor includes a frequency compensation network.

YVES ANDRÉ ROCARD.

REFERENCES CITED

The following references are of record in the file of this patent:

UNITED STATES PATENTS

| Number | Name | Date |
|---|---|---|
| 1,652,923 | Alexanderson | Dec. 13, 1927 |
| 2,257,031 | Barth | Sept. 23, 1941 |
| 2,267,395 | Chambers | Dec. 23, 1941 |
| 2,409,610 | Bixby | Oct. 22, 1946 |